United States Patent
Acar et al.

(10) Patent No.: US 9,606,934 B2
(45) Date of Patent: Mar. 28, 2017

(54) MATRIX ORDERING FOR CACHE EFFICIENCY IN PERFORMING LARGE SPARSE MATRIX OPERATIONS

(71) Applicant: International Business Machines Corporation, Armonk, NY (US)

(72) Inventors: Emrah Acar, Montvale, NJ (US); Rajesh R. Bordawekar, Yorktown Heights, NY (US); Michele M. Franceschini, White Plains, NY (US); Luis A. Lastras-Montano, Cortlandt Manor, NY (US); Ruchir Puri, Baldwin Place, NY (US); Haifeng Qian, White Plains, NY (US); Livio B. Soares, New York, NY (US)

(73) Assignee: International Business Machines Corporation, Armonk, NY (US)

(*) Notice: Subject to any disclaimer, the term of this patent is extended or adjusted under 35 U.S.C. 154(b) by 227 days.

(21) Appl. No.: 14/611,297

(22) Filed: Feb. 2, 2015

(65) Prior Publication Data

US 2016/0224473 A1     Aug. 4, 2016

(51) Int. Cl.
*G06F 12/08* (2016.01)
*G06F 17/30* (2006.01)
(Continued)

(52) U.S. Cl.
CPC .......... *G06F 12/0895* (2013.01); *G06F 17/16* (2013.01); *G06F 17/30631* (2013.01); *G06F 17/30705* (2013.01); *G06F 2212/601* (2013.01)

(58) Field of Classification Search
USPC ........................................................ 708/520
See application file for complete search history.

(56) References Cited

U.S. PATENT DOCUMENTS 5,905,666 A *  5/1999  Hoffman ................. G06F 17/16
                                                        700/99
8,775,495 B2 *  7/2014  Lumsdaine ............. G06F 17/16
                                                        708/520
(Continued)

FOREIGN PATENT DOCUMENTS

IE   WO 2006120664 A2 * 11/2006 ............. G06F 17/16

OTHER PUBLICATIONS

Cuthill, E. et al., "Reducing the Bandwidth of Sparse Symmetric Matrices", Proceedings of the National Conference of ACM, 1969, pp. 157-172.

(Continued)

*Primary Examiner* — Yaima Rigol
(74) *Attorney, Agent, or Firm* — Stephen J. Walder, Jr.; William J. Stock

(57) ABSTRACT

Mechanisms are provided for performing a matrix operation. A processor of a data processing system is configured to perform cluster-based matrix reordering of an input matrix. An input matrix, which comprises nodes associated with elements of the matrix, is received. The nodes are clustered into clusters based on numbers of connections with other nodes within and between the clusters, and the clusters are ordered by minimizing a total length of cross cluster connections between nodes of the clusters, to thereby generate a reordered matrix. A lookup table is generated identifying new locations of nodes of the input matrix, in the reordered matrix. A matrix operation is then performed based on the reordered matrix and the lookup table.

21 Claims, 8 Drawing Sheets

(51) Int. Cl.
*G06F 12/0895* (2016.01)
*G06F 17/16* (2006.01)

(56) References Cited

U.S. PATENT DOCUMENTS

| | | | |
|---|---|---|---|
| 2009/0063607 A1* | 3/2009 | Gustavson | G06F 17/16 708/520 |
| 2009/0287678 A1 | 11/2009 | Brown et al. | |
| 2010/0223258 A1* | 9/2010 | Ghahramani | G06F 17/30247 707/723 |
| 2011/0066587 A1 | 3/2011 | Ferrucci et al. | |
| 2011/0125734 A1 | 5/2011 | Duboue et al. | |
| 2011/0302371 A1* | 12/2011 | Lysko | G06F 1/0353 711/118 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2016/0179750 A1* | 6/2016 | Zhou | G06F 17/16 708/203 |

OTHER PUBLICATIONS

George, Alan, "Nested Dissection of a Regular Finite Element Mesh", SIAM Journal on Numerical Analysis, vol. 10, No. 2, Apr. 1973, pp. 345-363.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

\* cited by examiner

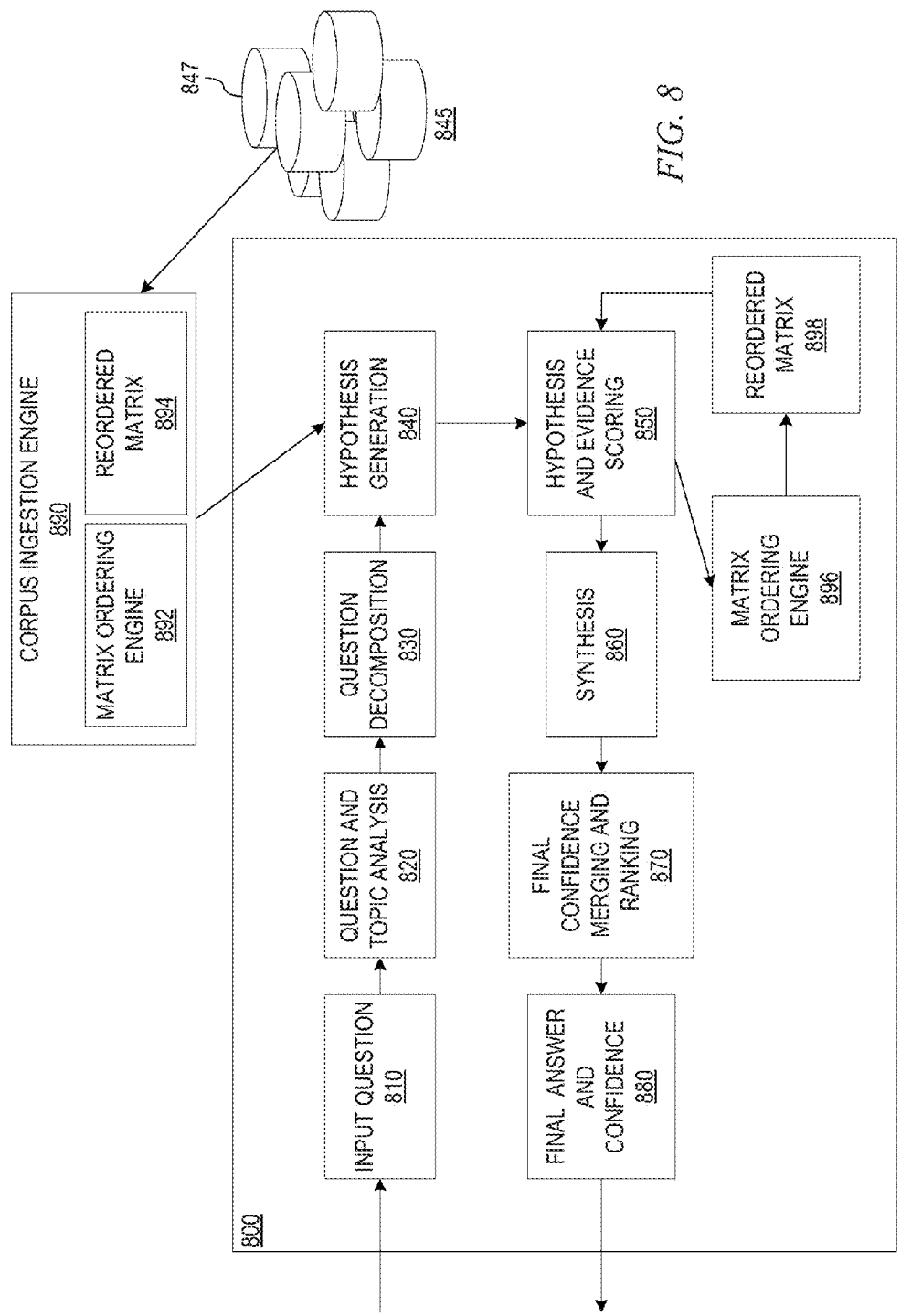

MATRIX ORDERING FOR CACHE EFFICIENCY IN PERFORMING LARGE SPARSE MATRIX OPERATIONS

BACKGROUND

The present application relates generally to an improved data processing apparatus and method and more specifically to mechanisms for ordering non-zero elements of a matrix used in a large sparse matrix operation so as to increase cache efficiency.

Everyday life is dominated by information technology and systems for obtaining information and knowledge from collections of data. For example, search engines operate on large collections of data to obtain information related to a search query. Question and Answer (QA) systems, such as the IBM Watson™ QA system available from International Business Machines (IBM) Corporation of Armonk, N.Y., operates on a corpus of documents or other portions of information to answer natural language questions. Moreover, many social networking services represent their users, communications, and the like, as large data sets. Many times it is important to perform knowledge extraction, reasoning, and various other analytics on these large scale data sets so as to facilitate the operation of the systems, e.g., answer questions, return search results, or provide functionality within the social networking services. For example, many social networking services help individuals identify other registered users that they may know or have a connection with. Such functionality requires analyzing a large set of data representing the users of the social networking service.

SUMMARY

In one illustrative embodiment, a method is provided, in a data processing system comprising a processor and a memory, for performing a matrix operation. The method comprises configuring the processor of the data processing system to perform cluster-based matrix reordering of an input matrix. The method further comprises receiving, by the processor, the input matrix which comprises nodes associated with elements of the matrix. The method also comprises clustering, by the processor, the nodes into clusters based on numbers of connections with other nodes within and between the clusters, and ordering, by the processor, the clusters by minimizing a total length of cross cluster connections between nodes of the clusters, to thereby generate a reordered matrix. Moreover, the method comprises generating, by the processor, a lookup table identifying new locations of nodes of the input matrix, in the reordered matrix, and performing, by the processor, a matrix operation based on the reordered matrix and the lookup table.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 8 illustrates a QA system pipeline for processing an input question in accordance with one illustrative embodiment.

DETAILED DESCRIPTION

Figure 1A:
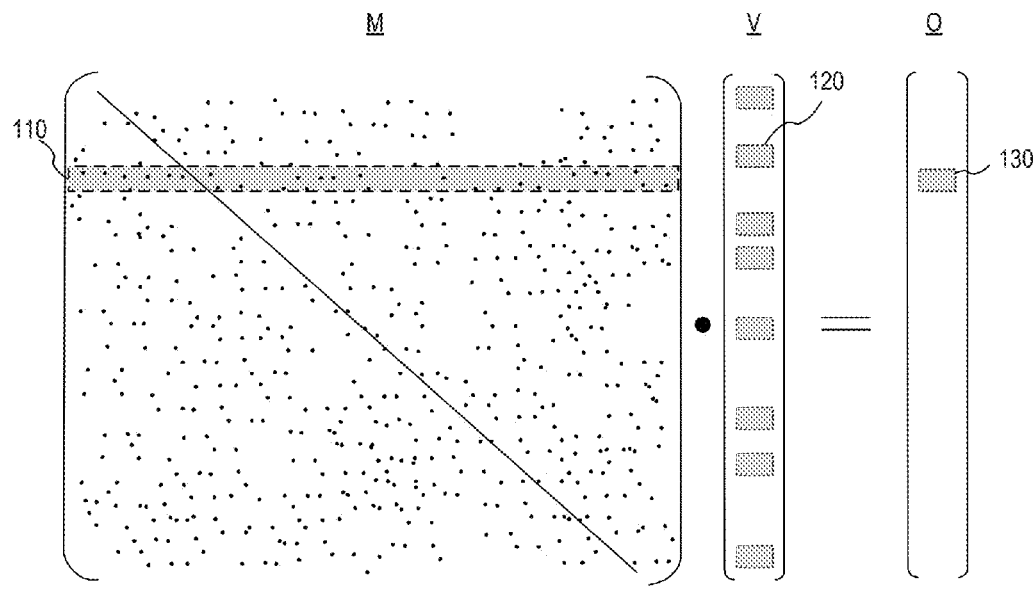
FIG. 1A is an example diagram illustrating a matrix multiplication operation with compressed row storage in which a row of the matrix is multiplied with entries in an input vector.

As discussed above, modern computing systems often are engaged in performing knowledge extraction, reasoning, and various other analytical operations on large scale data sets. These large scale data sets are often represented as large scale matrices and the operations themselves often involve runtime resource-intensive large sparse matrix operations. That is, matrix operations are performed on these matrices to extract relationships between the entries in the matrices so as to glean knowledge, perform reasoning operations, or the like. For example, if a process wants to know who User A may know in the social network, User A may be represented as an entry, or index, in the matrix and other users may be represented as other entries, or indices, in the matrix, organized into rows and columns. Intersections of rows and columns in the matrix have values that are set to non-zero values if User A knows the other user, e.g., if User A is represented as an entry in a row, entries along the columns may represent other users and the intersection of each column with User A represents whether or not user A knows that other user (non-zero if User A does know the user and zero if User A does not know). Thus, the efficiency by which functionality of the system is provided may be limited by the efficiency and speed of performing the matrix operations on these large scale data sets.

The illustrative embodiments provide mechanisms for reordering matrices using a clustering algorithm so as to increase cache efficiency for large sparse matrix operations. The mechanisms of the illustrative embodiments identify cliques of elements within a large sparse matrix and uses these cliques to grow clusters of elements having connections to one another. The growing of the clusters comprises assigning elements to clusters based on with which cluster the element has the most connections. As elements are added to a cluster, the information about the cluster is updated to take into consideration the addition of the element and to determine if the cluster has reached a maximum size.

Once the clusters have been grown, the clusters may be refined by analyzing connections of the elements of the clusters both within the cluster and across clusters to determine if elements in a cluster are better suited for inclusion in other clusters. For example, if moving an element from one cluster to another will reduce the number of cross-cluster connections without violating cluster size limitations, then the element is moved from its current cluster to the other cluster.

Once refined, the refined clusters are organized so as to minimize cross-cluster connections and concentrate cross-cluster connections in terms of their two end element distribution. In addition, elements may be ordered within the cluster so as to move non-zero elements closer to a diagonal of the cluster. Indices to the re-organized elements in the matrix are updated in a lookup table so as to point the original location of the elements in the matrix to the new re-ordered location within the re-ordered matrix. The lookup table and re-ordered matrix may then be output and utilized to organize data in memory, such as a main memory of a data processing system from which data is loaded into a cache memory, when performing large sparse matrix operations, such as for purposes of extracting knowledge, performing reasoning operations, analyze matrices of data to identify relationships between objects, concepts, or entities represented by the matrices, or the like.

The description set forth herein will utilize terms associated with matrices and matrix operations and thus, it is important to first understand what these terms represent in the context of the present description. An "index" of a matrix refers to a row or column designation for the matrix, e.g., a row index of "1" refers to the first row in the matrix and a column index of "1" refers to a first column in the matrix. The term "node" also refers to an "index" and is interchangeable with the term "index". The term "node" refers to the representation of a graph of inter-related elements as a matrix, where the elements of the graph are referred to as "nodes" and are represented in a matrix as an index, e.g., a network is often represented as a graph comprising nodes and "edges" or "connections" between the nodes.

A "location" in a matrix is a combination of a row index and a column index, e.g., (1, 1) points to the location in the matrix corresponding to row 1 and column 1. The terms "location", "node", and "index" or "indices" may sometimes be be interchanged since they all utilize the index values to represent portions of the matrix, but with different connotations as noted above. That is, the index refers to the the row and column indicators, the node also refers to the indices but has the connotation of a graph node represented as an index, and the location in the matrix is the portion of the matrix where the value representing the intersection of the row and column is stored. A non-zero value stored in a particular location of a matrix is referred to herein as a "connection" or "relationship" since it designates a connection or relationship between the two indices corresponding to that location, e.g., in a graph of a person's friends on a social networking site, a non-zero value may indicate that person A is friends with person B. The non-zero value itself may have various values values indicative of a strength of the relationship or connection between the two indices.

While numerical designations for indices, nodes, and locations may be utilized, in some implementations of the illustrative embodiments, the indices may represent various types of information, concepts, or entities and thus, may not necessarily be numerical. For example, rather than using numerical row and column indices, the indices may be identifiers of persons, places, things, concepts, or the like, e.g., a row index of "John Smith" or "person A" and a column index of "Mary Johnson" or "person B".

The illustrative embodiments provide mechanisms for reordering a matrix of information, stored in a main memory or other system storage, for more efficient performance of a matrix operation as will be described in greater detail hereafter. As part of this reorganization, nodes are clustered and reorganized so that non-zero elements are as close to the diagonal of the matrix as possible. As will be described hereafter, the reordered matrix is generated by the mechanisms of the illustrative embodiments along with a lookup table that comprises vectors for mapping the old locations of nodes to new locations of nodes. Thus, in order to illustrate the nuances of the above terms in the context of matrix reordering, consider the following example simplified matrix in which row and column indices represent five persons labeled A-E:

|   | A | B | C | D | E |
|---|---|---|---|---|---|
| A |   |   | 1 |   |   |
| B |   |   |   | 1 |   |
| C | 1 |   |   |   | 1 |
| D |   | 1 |   |   |   |
| E |   |   | 1 |   |   |

Assuming that the above matrix is the original matrix, person A corresponds to a numerical index 1, person B corresponds to a numerical index 2, etc. Through operation of the illustrative embodiments, as described hereafter, the matrix may be reorganized by clustering indices, or nodes, e.g., by clustering the people, based on the identification of non-zero values in the matrix, which represent connections or relationships between people. For example, it may be determined through operation of the illustrative embodiments, as depicted below, that the indices 1, 3, and 5 (persons A, C, and E) belong in one cluster and indices 2 and 4 (persons B and D) belong in another cluster. The new reordered matrix according to such clustering would be as follows:

|   | A | C | E | B | D |
|---|---|---|---|---|---|
| A |   |   | 1 |   |   |
| C | 1 |   |   | 1 |   |
| E |   | 1 |   |   |   |
| B |   |   |   |   | 1 |
| D |   |   |   | 1 |   |

In addition to generating this reorganized matrix, the illustrative embodiments generate a lookup table that maps the old locations of the indices with the new location of the indices (or nodes). In the above example, the lookup table is represent as two vectors, one to store the old location index values, and another to store the new location index values, which together provide the following mapping:

1→1
2→4
3→2
4→5
5→3

As mentioned above, many knowledge representations, reasoning algorithms, social network applications, and the like, have runtime resource-intensive large sparse matrix operations. In such cases, the runtime operations are dominated by cache misses since much of the large sparse matrices are populated with zero entries and non-zero entries may be sparsely spread across the matrix. Moreover, cache memories used to store portions of these large matrices and vectors that they interact with have limited size such that only a relatively small portion of the matrix and input/output vectors may be loaded into the cache memory at a time for performance of matrix operation. For example, if the cache size is X and a first non-zero element of the matrix interacts with an entry within a first portion of size X of a vector but a next non-zero element interacts with another entry in a second portion of the vector that lies at a location greater than size X away, then a cache miss occurs and the second portion must be retrieved from main memory or storage and loaded into the cache memory before the matrix operation can continue. Since such matrices can be very large and very sparsely populated, such cache misses happen often and result in a large source of inefficiency when performing such large sparse matrix operations.

In systems that utilize large sparse matrices to represent concept relations and social relationships, interactions, and the like, such as natural language processing based knowledge systems, social networking analysis systems, and the like, the topologies of these large sparse matrices are often near-scale-free graphs or networks (where "graph" or "network" refers to a system of nodes and edges connecting nodes—graphs and networks may be represented as matrices as discussed above). The term "scale-free" graph or network refers to a graph or network whose degree distribution (probability distribution of the number of connections a node has to other nodes (the "degree")) follows a power law, at least asymptotically. That is the fraction P(k) of nodes in the graph or network having k connections to other nodes goes, for large values of k, as $P(k) \sim k^{-\gamma}$ where $\gamma$ is a parameter whose value is typically in the range of 2 to 3. A "near-scale-free" graph or network approximates this scale-free graph or network condition.

Runtime execution of such matrix operations is dominated by memory accesses, however traditional matrix ordering algorithms have little effect on these types of matrices due to their topology characteristics. That is, the topological characteristics of these types of matrices cause them to approximate a scale-free graph, i.e. they are near-scale-free graph topology matrices. Compared with sparse matrices from traditional simulation applications, scale-free graphs tend to have shorter distances (number of edges in a shortest path to reach one node from another) between nodes and they tend to require large cut size (number of edges one has to cut) when partitioning a graph.

Figure 1B:
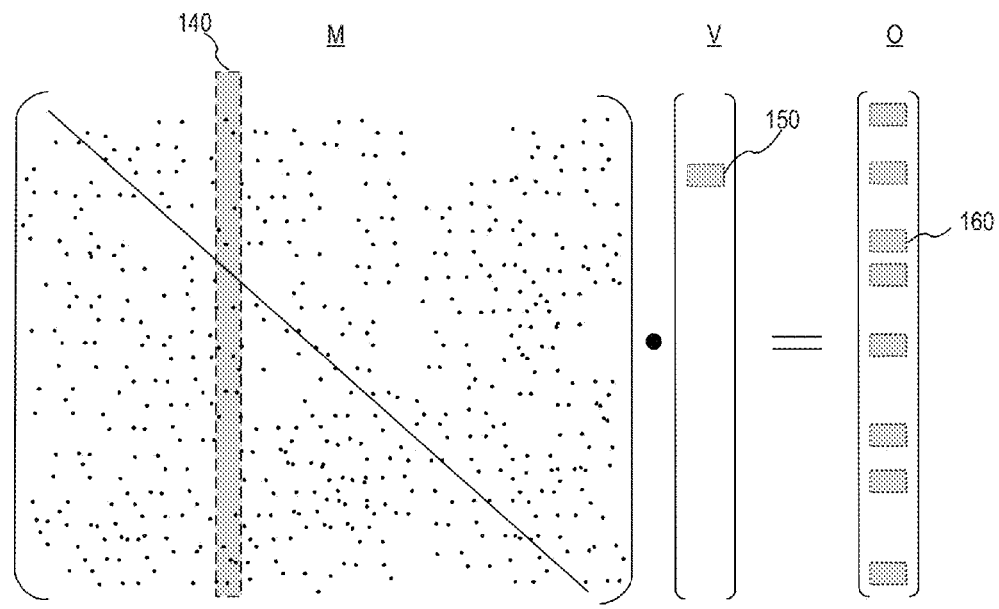
FIG. 1B is an example diagram illustrating a matrix multiplication operation with compressed column storage in which a column of the matrix is multiplied with a single entry in the input vector to provide fractional contributions to entries in the output vector.

One basic matrix operation used with sparse matrices, and which is the basis for most knowledge extraction, reasoning operations, relationship analysis, and the like, is sparse matrix to vector multiplication. Thus, such sparse matrix to vector multiplication also tends to be the basis for runtime bottlenecks in knowledge, reasoning, and relationship analysis algorithms. FIGS. 1A and 1B illustrate examples of the two most popular ways of performing sparse matrix to vector multiplication. Other methods for performing such sparse matrix to vector multiplication are variations or combinations of these two most popular ways.

FIG. 1A is an example diagram illustrating a matrix multiplication operation with compressed row storage in which a row of the matrix is multiplied with entries in an input vector. As shown in FIG. 1A, a matrix M of elements, e.g., user identifiers, concept identifiers, informational objects, or the like that represent the indices of the matrix, is provided such that rows of the matrix M are multiplied by selected entries in the input vector V in order to compute one entry in the output vector O. For example, in a social networking implementation, row and column indices of the matrix M represent users in the social network with the intersection of rows and columns representing a relationship between a row user with a column user, e.g., if John Smith (row) has a relationship with Mike Johnson (column), then the entry in the matrix M corresponding to this intersection may be set to a non-zero value, e.g., indicating that Mike Johnson is a friend of John Smith.

The input vector V, in this social networking example may comprise, for example, entries representing the current friend list of a person B (Jane Doe, for example). Thus, an entry in the output vector O is non-zero if the corresponding person B has at least one common friend with person A (John Smith, for example), and the more common friends that persons A and B have, the larger the entry is in the output vector O.

In an alternative example, assume that row and column indices of the matrix M represent concepts, and the intersection of row A and column B is non-zero if concept A and concept B are related, and the more related they are the larger the entry is. For example, assume that the concept "mental disorder" and concept "psychiatrist" are strongly related and this relation is represented by a non-zero and large value, while the concept "mental disorder" and the concept "ice cream" are unrelated and the corresponding entry is zero. Assume that an input vector represents represents concepts in a question, where an entry is non-zero if the corresponding concept is included in the question, e.g., a question "Where can I buy ice cream in Manhattan?" would result in a vector where the entry for the concept "ice cream" is non-zero and that for "Manhattan" is non-zero. Multiplying the matrix M with the input vector V results in an entry in the output vector O being non-zero if, and only if, the corresponding concept is related to either "ice cream" or "Manhattan". Thus, an ice cream shop in Manhattan would likely have a large value in the output vector because it is related to both concepts in the input vector V. Note that this is only a basic example, and more sophisticated matrix operations (which are comprised of more matrix-vector multiplications where vectors become dense) would yield more complex results.

With such matrix and vector multiplication operations, it can be appreciated that as the matrix M and the input vector V become larger, the reading in of selected elements of the matrix M and the input vector V causes cache misses due to the limited size of the cache memory and the large size of the matrix and/or vector that is being processed. These cache misses dominate the runtime cost of performing the matrix multiplication operation.

For example, using the elements of FIG. 1A as an example, multiplying one row in the matrix M with the input vector V requires reading selected entries 120 of the input vector V. The locations of these selected entries are dictated by the column indices of the non-zero entries in the row 110 of the matrix M. The result is written to an entry 130 in vector output O. When the processor reads one of these selected entries 120 in the input vector V, that entry is loaded into the cache memory along with a portion of the input vector V around it. The reason for loading a portion of memory around the target data of the selected entry into cache memory is to hope, or speculate, that future data requests will fall into that portion of memory. This is a common practice in all data processing systems with cache memories for computing workloads.

In the case of sparse matrix-vector multiplication, whether this hope materializes, i.e. the speculative loading of data into the cache results in cache hits, depends on the column index of the next non-zero entries in the matrix M. That is, the speculative loading of the cache results in a cache hit only when the next column index happens to fall in the portion that was loaded around the selected entry 120.

In a social network example, suppose a row in the matrix M represents Tom's friend list, and Tom has five friends. If these five friends are indexed as the 1000001th person, 1000002th person, . . . 1000005th person, then their entries in the input vector V are loaded into cache memory together when the processor first asks for the 1000001th entry, and therefore there are no cache misses and subsequent data requests for 1000002th to 1000005th entries in the input vector V are satisfied by the data already present in the cache memory due to the speculative loading of the cache memory. On the other hand, if Tom's five friends are indexed as the 1000000th person, 2000000th person, . . . 5000000th person, then cache misses will happen while processing this row of the matrix M, and the processor has to make separate requests to load each of the five entries in the input vector V from main memory. The wait time for each loading from main memory can be hundreds of times that of an arithmetic operation. These cache misses happen in the processing of each row of the the matrix M, and their total latencies add up to a dominant portion of sparse matrix-vector multiplication runtime operation.

FIG. 1B is an example diagram illustrating a matrix multiplication operation with compressed column storage in which a column of the matrix is multiplied with a single entry in the input vector to provide fractional contributions to entries in the output vector. In the example shown in FIG. 1B, rather than multiplying a row 110 of the matrix M by selected entries 120 in the input vector V, a column 140 of the matrix M is multiplied by a single selected entry 150 in the input vector V to thereby compute fractional contributions to multiple entries 160 in the output vector O. The matrix multiplication operation of FIG. 1B results in a same output, i.e. results in output vector C, as the matrix multiplication operation shown in FIG. 1B with the difference being a difference in the way that data is arranged in memory and an organization of the computation.

In the example matrix multiplication operation of FIG. 1B, the operation of writing to selected entries 160 in the output vector O causes cache misses, which again dominate the runtime cost. That is, the locations of the entries 160 in the output output vector O of these selected writes are dictated by the row indices of the non-zero entries in the selected column 140 in the matrix M. When the processor writes to one of these selected entries 160 in the output vector O, that entry 160 is loaded into the cache memory along with a portion of the output vector O around it where again, the reason for loading a portion of the memory around the target data into the cache memory is to hope or speculate that future data requests will fall into that portion of the memory, i.e. speculative loading of the cache memory as discussed above. However, as with the example described above with regard to FIG. 1A, cache misses occur when the next index processed does not fall within that region of memory that was loaded into the cache memory, and this happens often when the non-zero data is sparsely located in the matrix M.

In both cases as shown in FIGS. 1A and 1B, the number of cache misses is strongly influenced by the non-zero data pattern of the sparse matrix. That is, as noted above, if the non-zero pattern is widely distributed in a sparse manner, then to operate on each of the non-zero elements of the matrix M, multiple readings/writings of portions of the input/output vector into the cache memory must be performed, i.e. multiple cache misses occur which then requires reading/writings of the corresponding elements in input/output vector from main memory. Thus, if the distance from one non-zero element to the next is larger than the cache size, then a cache miss occurs and an eviction of the cache with subsequent loading of a next portion of the input/output vector into the cache is performed. If the non-zero elements are more compact and less sparsely distributed, a larger number of non-zero elements will be in the cache memory at one time thereby reducing the number of cache misses.

In order to compact the non-zero elements, reordering algorithms seek to reorder the elements such that the non-zero element pattern causes a reduction in the number of cache misses and thus, the runtime performance of the matrix multiplication operation is improved. The most popular algorithms for attempting to compact the non-zero elements to generate a less sparsely distributed pattern of non-zero elements is the Cuthill-McKee algorithm, and its variations, such as the reverse Cuthill-McKee algorithm. The Cuthill-McKee algorithm is an algorithm to permute a sparse matrix that has a symmetric sparsity pattern into a band matrix form with a small bandwidth. The reverse Cuthill-McKee algorithm is the same algorithm but with the resulting index numbers of the matrix reversed.

The Cuthill-McKee algorithm is a variant of the standard breadth-first search algorithm used in graph algorithms. The Cuthill-McKee algorithm starts with a peripheral element (node) and then generates levels $R_i$ for i=1, 2, . . . until all nodes are exhausted. The set $R_{i+1}$ is created from set $R_i$ by listing all vertices adjacent to all nodes in $R_i$. These elements (nodes) are listed in increasing degree.

Figure 2A:
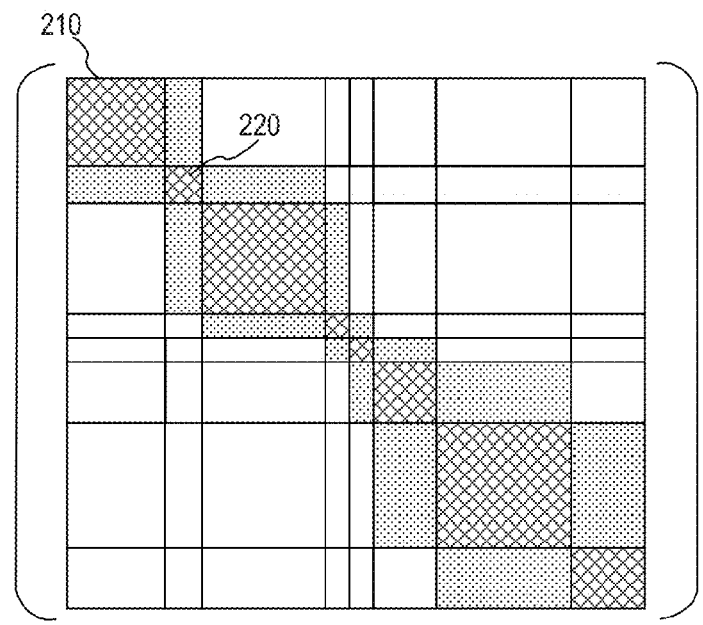
FIG. 2A is an example diagram illustrating an ideal outcome of a Cuthill-McKee matrix ordering algorithm.

FIG. 2A is an example diagram illustrating an ideal outcome of a Cuthill-McKee matrix ordering algorithm. As shown in FIG. 2A, the resulting reordered matrix is transformed into a narrow band matrix form in which a level of elements has only connections to its previous level and its next level, where a "level" is the set of column/row indices of a diagonal block (in FIG. 2A there are eight levels shown with level 1 containing indices 1 through the size of the upper left block 210, level 2 containing the indices of the next diagonal block 220, and so on). This results in the depicted block-tri-diagonal matrix where non-zero entries can only exist in diagonal blocks and next-to-diagonal blocks (the shaded regions shown in FIG. 2A).

While Cuthill-McKee works well for many types of matrices, problems occur when applying the Cuthill-McKee algorithm to matrices with near-scale-free graph topologies. In a near-scale-free graph, the existence of nodes (indices) with a high number of connections (non-zero values) causes the Cuthill-McKee's breadth-first search to produce levels with exponentially increasing sizes. Each level is much larger than the previous level, until one level encompasses a majority of the nodes in the graph.

Figure 2B:
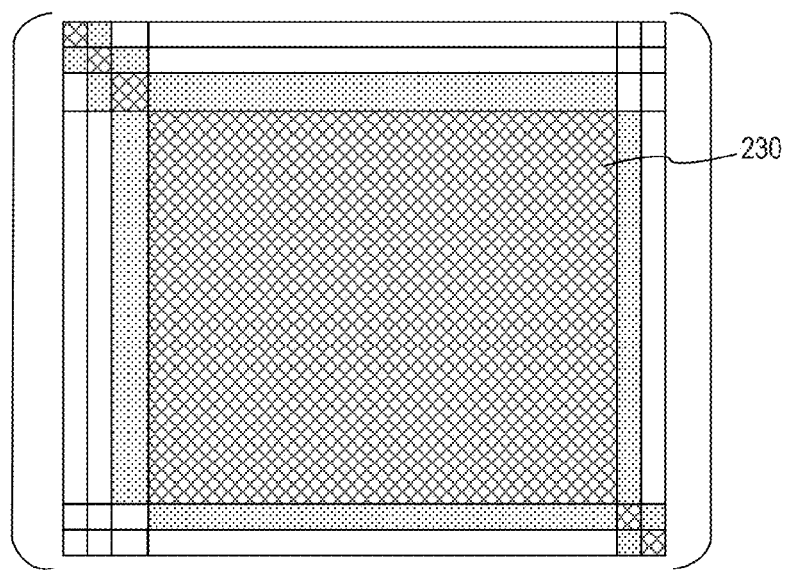
FIG. 2B is an example diagram illustrating an actual ordering of matrix entries obtained by the Cuthill-McKee algorithm on near-scale-free graphs.

FIG. 2B is an example diagram illustrating an actual ordering of matrix entries obtained by the Cuthill-McKee algorithm on near-scale-free graphs. As shown in FIG. 2B, the result of the application of the Cuthill-McKee algorithm to near-scale-free graph topology matrices is that a dominant chunk 230 of non-zero entries or elements is generated that is only marginally better than a random non-zero pattern, such as depicted in FIGS. 1A and 1B. Thus, applying Cuthill-McKee to matrices with near-scale-free graph topologies results in only a marginal improvement in cache efficiency. For example, on a matrix derived from the Wikipedia website content, runtime execution of search operations is only improved by approximately 10% when applying Cuthill-McKee to the matrix before performing the matrix operation.

Figure 3A:
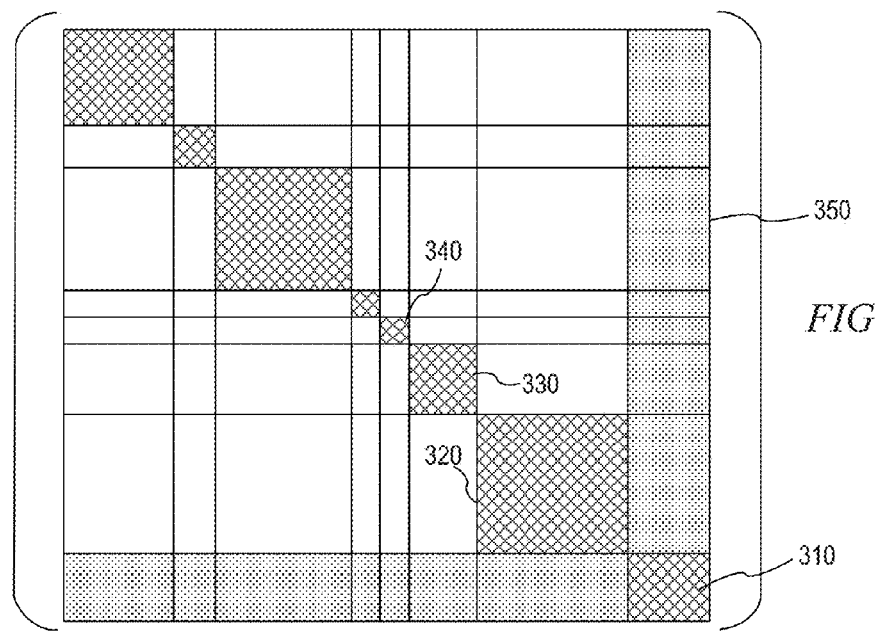
FIG. 3A is an example diagram illustrating an ideal outcome of a dissection matrix ordering algorithm.

Another category of algorithms for reordering matrices to concentrate non-zero entries or elements is referred to as dissection based reordering. With the dissection based reordering, a disconnecting node set is found such that remaining nodes form multiple disconnected sub-graphs. The rationale is that each of these sub-graphs can only have connections within itself and between itself and the disconnecting set. This results in a block matrix as shown in FIG. 3A, which represents an example of an ideal outcome of the dissection matrix reordering algorithm. In FIG. 3A, the block 310 at the lower right corner corresponds to the disconnecting set, and each of the other diagonal blocks 320-340, etc., corresponds to one of the disconnected sub-graphs. As shown in FIG. 3A, non-zero entries can only exist in diagonal blocks and certain border blocks 350.

Figure 3B:
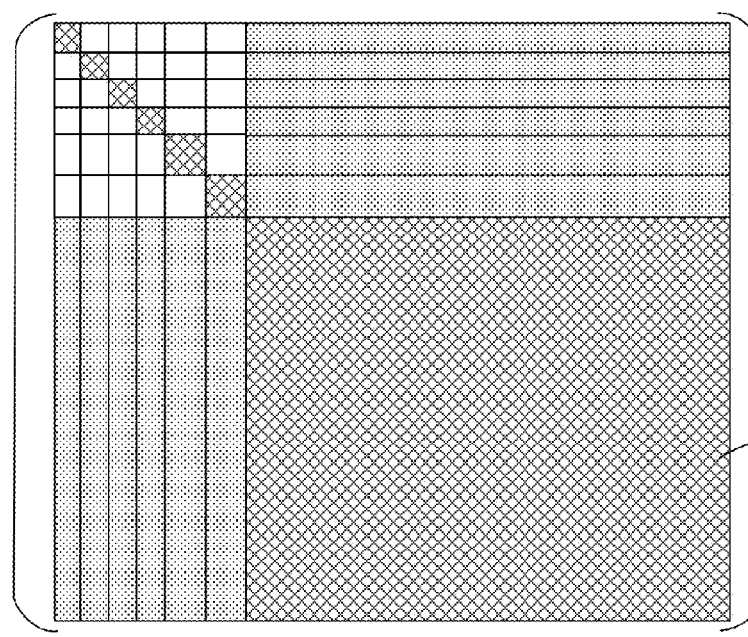
FIG. 3B is an example diagram illustrating an actual ordering of matrix entries obtained by the dissection algorithm on near-scale-free graphs.

Applying the dissection reordering algorithm to a matrix having a near-scale-free graph topology would result in a reordered matrix of the type shown in FIG. 3B. Similar to the Cuthill-McKee algorithm result, as shown in FIG. 2B, a dominant chunk 360 of non-zero entries or elements is generated that again is only marginally better than a random non-zero pattern, such as depicted in FIGS. 1A and 1B. Again, cache efficiency is only marginally improved by this matrix reordering when applied to near-scale-free graph topologies.

Thus, in each of the most popular approaches to matrix reordering, the nature of matrices having near-scale-free graph topologies causes the matrix reordering algorithms to fail to improve the runtime execution of matrix operations, such as matrix to vector multiplications. More and more actual real life data in today's world exhibits near-scale-free topology characteristics. This is especially true true of social networking environments, natural language processing mechanisms, or any other analytical mechanisms operating on large scale collections of data. As a result, the speed and efficiency by which knowledge extraction, reasoning, social networking analytics, other large scale data analytics, and the like, can be performed is limited due to the large sizes of the data operated on, the sparse nature of the large size data sets, the near-scale-free topology characteristics of the large size data sets, and the limited size of cache memories.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

As mentioned above, the illustrative embodiments provide a new class of matrix reordering mechanisms to improve cache efficiency in matrix operations, such as in performing a matrix to vector multiplication, which is the basis for many analytics performed on large scale sparse matrices. The mechanisms of the illustrative embodiments may be utilized with any sparse matrix, but is especially well suited for use with large scale matrices that exhibit a near-scale-free graph topology.

The mechanisms of the illustrative embodiments operate to build a non-zero entry or element pattern along the diagonal of the reordered matrix by using a clustering approach to cluster the nodes, or indices, that are strongly connected with each other, yet weakly connected across clusters. That is, each row/column index of a matrix M corresponds to a node in a graph and each off-diagonal non-zero entry corresponds to an edge between two nodes. For example, a non-zero value at row 3 and column 5 translates to an edge between node 3 and node 5, or "concept 3" and "concept 5", or "person 3" and "person 5". Thus, a "connection" or "relationships" between nodes is the non-zero entries that connect the nodes to one another.

The clusters of nodes that are generated are then ordered in a way such that (1) cross-cluster connections (or edges) are concentrated between adjacent clusters, i.e. clusters that are located next to one another in the reordered matrix, and (2) adjacent clusters tend to have cross-cluster connections to the same other cluster or to other adjacent clusters. For example, in FIG. 4, discussed in more detail hereafter, counting from the upper left to the lower right, the second and third clusters 412, 414 both have a large number of connections to the second to last cluster 416 and these connections (i.e. non-zero values) form the two off diagonal blocks 422, 424 to the right. Because the second and third clusters 412, 414 have a large number of connections to the same other cluster, it is advantageous to place them next to each other as shown in FIG. 4, because in this way, the two off diagonal blocks 422, 424 also sit next to each other in the reordered matrix.

These mechanisms of the illustrative embodiments operate by identifying cliques within the original matrix, growing the cliques into clusters, refining the clusters so as to reduce cross-cluster connections, ordering the clusters to minimize cross-cluster connection length, and then ordering nodes within each of the clusters to move non-zero entries or elements closer to the localized diagonal of the cluster. A resulting reordered matrix and associated lookup table of mapped indices is then output for use in performing the matrix operation, e.g., matrix to vector multiplication operation.

Figure 4:
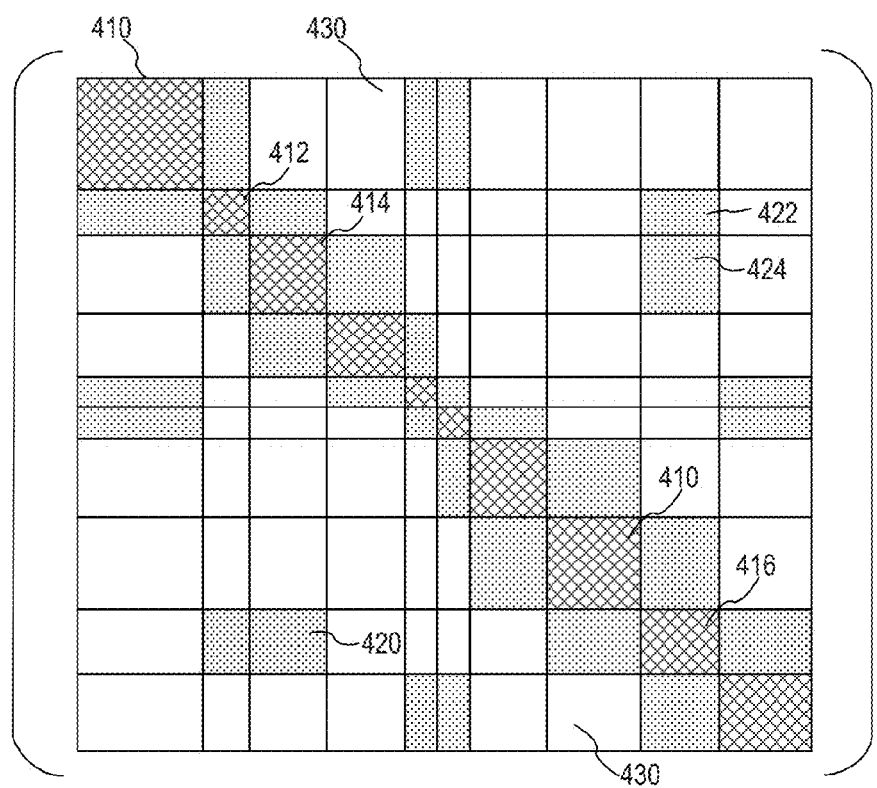
FIG. 4 is an example diagram illustrating an ordering of matrix entries obtained by using a clustering based matrix reordering operation in accordance with one illustrative embodiment.

FIG. 4 is an example diagram illustrating an ordering of matrix entries obtained by using a clustering based matrix reordering operation in accordance with one illustrative embodiment. As shown in FIG. 4 the resulting reordered matrix generated as a result of the operations of the mechanisms of the illustrative embodiments has non-zero entries or elements concentrated into clusters 410 near the diagonal and those non-zero entries that are far from the diagonal are closely collocated into off-diagonal clusters 420. Each of the clusters 410, 420 (represented as shaded regions of the matrix in FIG. 4), has non-zero entries that are loosely tied to one another, meaning that the number of connections the nodes corresponding to these entries or elements have to other nodes within the same cluster 410, 420 is greater than the number of connections the nodes have to nodes outside of the cluster 410, 420, e.g., movie stars have more connections to other movie stars than to general public and thus, movies stars would be a cluster. The non-shaded regions 430 of the matrix are permitted to include a small-number of non-zero entries or elements (referred to as "elements" hereafter), contrary to the other known mechanisms which require the non-shaded areas of the matrices in FIGS. 1A-3B to be populated with only zero elements.

The ordering of the matrix shown in FIG. 4 is achieved even for large scale matrices that have near-scale-free graph topologies. As seen from comparing FIG. 4 to FIGS. 2B and 3B, there is no dominant chunk of non-zero elements that is generated as a result of the matrix reordering operations. Thus, the limitations on the improvement in cache efficiency and runtime execution encountered with the known Cuthill-McKee and dissection algorithms discussed above are not an issue for the matrix reordering mechanisms of the illustrative embodiments. To the contrary, the matrix reordering mechanisms achieve the ideal reordering sought by the Cuthill-McKee algorithm, for large scale near-scale-free graph topology matrices, with only some off diagonal clusters 420 being present but with these being concentrated into their own clusters 420.

The benefits of this organization of clusters 410, 420 of non-zero elements along the diagonal is that cache misses are reduced during the matrix operation. That is, the matrix multiplication operation typically looks for non-zero elements in the matrix when performing the matrix multiplication operation. Since these non-zero elements are concentrated into clusters 410, 420, when a cluster is loaded into the cache memory, more cache hits occur with less cache misses. This is especially true for the clusters 410 positioned along the diagonal of the reordered matrix where even when additional clusters are loaded into the cache memory, the clusters are closely located to one another. Even for those non-zero elements that are off the diagonal, the majority of these non-zero elements are clustered within off-diagonal clusters 420 such that when these clusters are loaded into cache memory, there are less cache misses when accessing the corresponding entries in the input/output vector. While some non-zero elements are not in the clusters 410, 420, i.e. located in the non-shaded areas 430 of the reordered matrix, the efficiency increase obtained through the clustering outweighs the relative few non-zero elements that are not located in clusters 410, 420.

The clustering methodology of the mechanisms of the illustrative embodiments concentrates the non-zero elements into closely tied clusters 410, 420 as opposed to the known Cuthill-McKee algorithm which is more concerned with graph distances, as represented by the various levels utilized in the Cuthill-McKee algorithm. Because Cuthill-McKee is more concerned with graph distances, it is possible to have large chunks of non-zero elements that do not improve cache efficiency as discussed above. Moreover, with dissection algorithms, the concern is to look for disconnected sets of data such that if the set of data is taken out of the matrix, the remaining data will be connected. Again, this can lead to large chunks of non-zero elements that do not improve cache efficiency as discussed above. Because the mechanisms of the illustrative embodiments utilize closely tied clusters 410, 420, the possibility of large chunks of non-zero elements is significantly reduced. Moreover, because the mechanisms of the illustrative embodiments organize the clusters 410, 420 so as to reduce cross cluster connections and cross cluster connection lengths, the clusters 410, 420 are organized in a compact configuration within the reordered matrix making for more efficient loading of the non-zero elements into cache memory and thereby reducing cache misses.

To illustrate the amount of efficiency increase that is achieved by implementation of the mechanisms of the illustrative embodiments, consider the following Table 1 which illustrates results of a sparse matrix to vector multiplication benchmark that is used to evaluate the number of cache misses on an Intel Nehalem processor with and without the matrix reordering mechanisms of the illustrative embodiments.

TABLE 1

Sparse Matrix to Vector Multiplication Benchmark

|  | Without Reordering | With Reordering |
|---|---|---|
| INST_RETIRED.ANY | 527,852 Mil | 552,980 Mil |
| MEM_INST_RETIRED.LOADS | 145,950 Mil | 139,740 Mil |
| L2_LINES_IN.ANY | 10,326 Mil | 7,524 Mil |
| OFFCORE_RESPONSE_0.ANY_DATA.ANY_LLC_MISS | 4,158 Mil | 2,365 Mil |

Each row of the table represents a hardware counter. The first row is the total number of instructions. The second row is the number of memory load instructions. The third row is the number of L2 cache misses. The fourth row is the number of L3 cache misses, which are the most expensive and dominate runtime. It should be noted that the L3 cache misses are reduced by almost half through use of the reordering mechanisms of the illustrative embodiments. The measured runtime execution is also reduced by almost half by the reordering mechanisms of the illustrative embodiments, which is far superior than the 10% improvement achieved by the Cuthill-McKee or dissection algorithms.

Having illustrated the results obtained by the clustering based matrix reordering mechanisms of the illustrative embodiments, the following is a more detailed discussion of the mechanisms and operations performed as part of this clustering based matrix reordering. It should be appreciated that the following discussion is directed to one illustrative embodiment for implementing the clustering based matrix reordering and is not intended to be limiting but rather illustrative of one example methodology and mechanisms used to perform this reordering. Many modifications may be made to the illustrative embodiments as will become apparent to those of ordinary skill in the art in view of the present description, without departing from the spirit and scope of the present invention.

Figure 5:
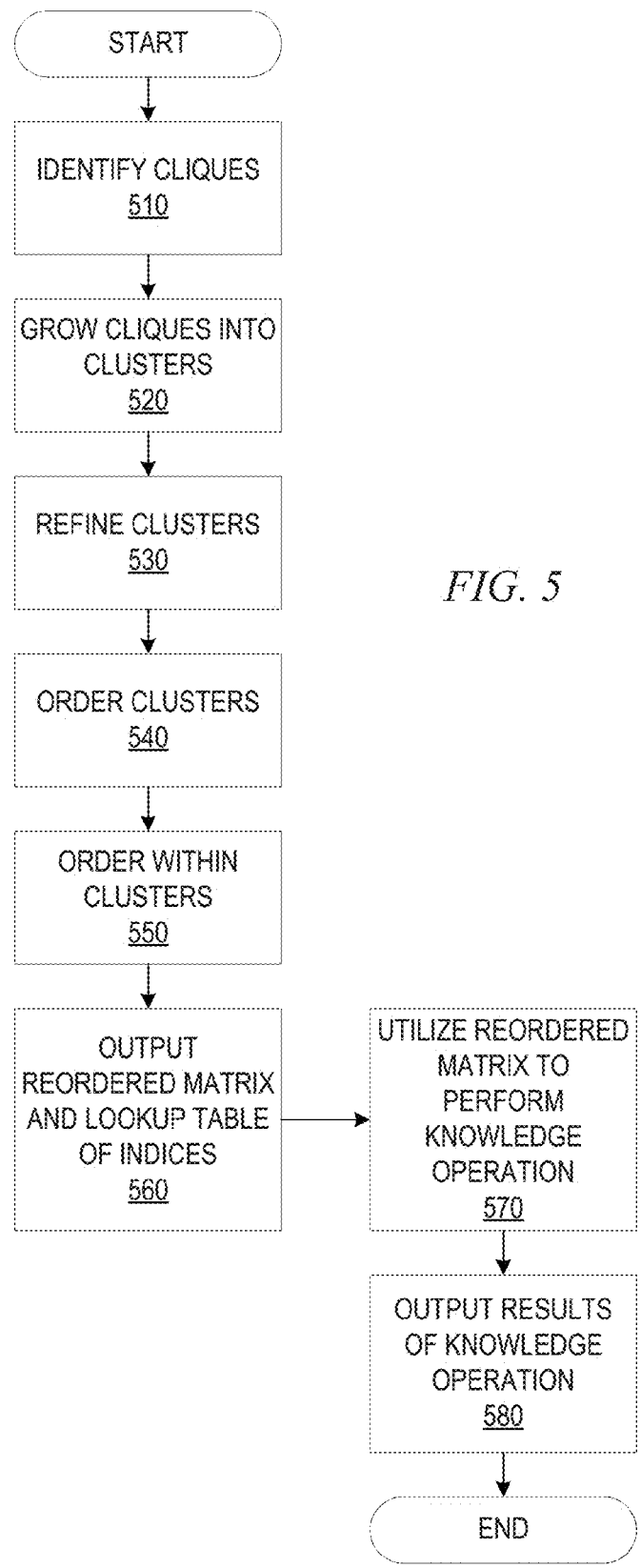
FIG. 5 is a flowchart outlining an example clustering based matrix reordering operation in accordance with one illustrative embodiment.

FIG. 5 is a flowchart outlining an example clustering based matrix reordering operation in accordance with one illustrative embodiment. The clustering based matrix reordering operation shown in FIG. 5 may be implemented in specially configured hardware configured to implement the operations described hereafter, software executed on hardware and configured to implement these operations, or any combination of specially configured hardware and software executed on hardware. To illustrate the operation of the illustrative embodiments in association with the description of the operations set forth in FIG. 5, an example in which a matrix M is comprised of indices or nodes corresponding to users of a social networking service will be utilized, where non-zero elements corresponding to the indices or nodes are indicative of a relationship between the users represented by the indices or nodes. It should be appreciated that this is only an example and the mechanisms of the illustrative embodiments may be utilized with any matrix operation performed on any large scale matrix having a near-scale-free graph topology.

As shown in FIG. 5, the operation starts by analyzing an input matrix M to identify cliques within the matrix M (step 510). The input matrix M may be a set of collected data representing connections or relationships between particular information objects, concepts, entities, or the like, which are specified as indices of the matrix M. For example, in a social networking environment, the indices of the matrix M may represent users of the social networking services, their attributes, communications exchanged between the users, or the like. In a question answering environment or internet search environment, the indices of the matrix M may represent features of documents in the corpus of information that is used as a basis for performing the question answering or internet search. Thus, the indices in the input matrix M represent any information, concepts, or entities that are suitable for the performance of a knowledge extraction, reasoning, or other analysis operations. The entries at the intersection of two indices stores a value indicative of the existence or non-existence of a relationship between the information, concepts, or entities represented by the indices that intersect.

A clique is defined as a set of row and column indices (or nodes) of the matrix such that their submatrix is composed of all non-zero entries. For example, if a first user represented in matrix M is connected to a second user and vice versa, the two users may constitute a clique. The clique may be identified by using a starting node or index and identifying other nodes or indices within the matrix M that are connected to the starting node or index and vice versa, i.e. the intersections of the indices identifies a non-zero value element in the matrix M. This process can be repeated for each of the nodes or indices that are connected to the starting node or index where some of the connected nodes or indices (hereafter referred to simply as "nodes") may be part of the clique while others are not. That is, for example, if John Smith is the starting node and has a "friend" connection to Pete Johnson, and Pete Johnson has a "friend" connection to John Smith, then John Smith and Pete Johnson may constitute a clique. If Pete Johnson did not have a connection to John Smith, then Pete Johnson may not be included in the clique, although, as discussed hereafter, he may be included in the subsequently generated cluster.

The process of generating cliques may be repeated for each node in the input matrix M such that multiple cliques are generated. A minimum size requirement may be specified in a configuration parameter that indicates a minimum number of nodes that must be present in the clique for the clique to be maintained for further use as a starting point for the other operations in FIG. 5, e.g., the clique must have at least 20 nodes, where smaller size cliques having less than 20 nodes are discarded.

Having generated the cliques as initial clusters of connected nodes of the matrix, a cluster growth operation is performed to grow clusters from each of the cliques (step 520). In growing the cliques into clusters, the nodes of the matrix that are not already part of a clique are assigned to a cluster. The assignment of nodes to clusters is based on the number of connections that the corresponding row/column has to nodes already within the cluster. That is, the node is added to a cluster to which it has the most connections, i.e. non-zero value elements associated with other nodes of the cluster. This may leave some nodes without a cluster if the node does not have any connections to the other nodes or relatively few connections to other nodes. As a node joins a cluster, the data structure representing the cluster is updated and the newly added node is used as a basis for adding additional nodes, e.g., if John Smith is added to a cluster of users that represents friends of Mary Monroe, then friends of John Smith may further be used as a basis for determining if any of these friends should be added to the cluster of friends of Mary Monroe.

In this way, the cluster grows from an initial clique to a larger size cluster. A maximum cluster size for clusters may be set in configuration parameters of the clustering-based matrix reordering mechanisms. The maximum cluster size may be set as a function of the memory hierarchy parameters, e.g., cache sizes, in the computing architecture in which the mechanisms of the cluster-based matrix reordering are to be implemented. For example, a cluster maximum size may be set to a size equal to a proportion of a particular cache size in the architecture, e.g., the X % of the L3 cache size, for example.

Once each of the non-zero elements of the matrix have been processed and corresponding nodes added to clusters in the manner described above, the clusters may be refined by allowing nodes to be reassigned to other clusters (step 530). For example, the nodes of each cluster may be analyzed to determine if they have more connections to nodes of other clusters than to nodes in their currently assigned cluster. If a node in cluster A has more connections (non-zero elements) to nodes in cluster B, then the node may be reassigned to cluster B. The reassignment may be permitted by the cluster-based matrix reordering mechanisms in response to a determination that the reassignment will result in reduction in the total number of cross-cluster connections (or edges) without violating cluster maximum size limitations. Thus, if cluster B is already at a maximum size, the reassignment may be denied. Moreover, if the reassignment does not reduce the total number of cross-cluster connections, the reassignment may be denied. This refining may be performed with regard to each node of each cluster generated in step 520.

Having refined the clustering of the nodes in step 530, the resulting clusters are ordered so as to minimize the total length of cross-cluster connections (or edges), i.e. minimize how far away the node entries are from the diagonal of the matrix (step 540). Moreover, as part of this operation, cross-cluster connections are concentrated in terms of their two end nodes distribution, i.e. length of connections between the two nodes of the connection is minimized. This operation may be implemented as a dynamic programming algorithm which optimizes a partial solution at a time and the partial solution is incremented one cluster by one cluster until all are ordered.

Although not required, and instead being an optional operation, nodes within the ordered clusters may themselves be ordered locally within the cluster (step 550). This local ordering of the clusters moves the non-zero entries closer to the diagonal within the cluster and moves nodes with cross-cluster connections closer to the boundaries of the cluster. That is, when ordering within a cluster, if node of the matrix in the cluster has connections (non-zero elements) to nodes of other clusters that are ordered before the cluster, then the node is located at an early location (towards a "front end") within this cluster such that its cross-cluster non-zeroes are closer to the diagonal of the reordered matrix. In the same manner, if a node has connections (non-zero elements) to other clusters that are ordered after this cluster, the node is located in a later location (towards a "back end") within the cluster. At the local level, such reordering within the clusters may be accomplished by performing the same operations as discussed above (steps 510-540) but on the local cluster, or other known algorithms may be used to reorder the non-zero elements, such as Cuthill-McKee or dissection. It should be noted that the known algorithms may be used on the individual clusters for intra-cluster reorganization because the cluster is a relatively smaller and more strongly connected sub-graph (not as sparsely populated) such that there is not a large difference in cache efficiency between reordering algorithms.

It should be appreciated that, either while this reordering process is being performed or after this reordering process is complete, vectors in a lookup table are updated to represent the new locations of the elements that have been moved. For example, the lookup table may comprise a first vector with locations of the indices of the original matrix M and a second vector having the new locations after the reordering is performed, with pointers from one vector entry to the other so as to allow mapping of the elements' original locations to their new locations in the reordered matrix. This lookup table and the reordered matrix may be output for use in performing matrix operations and ultimately, the knowledge extraction operations, reasoning operations, or other analytical operations (step 560).

During runtime operation, the output lookup table and reordered matrix may be used to perform matrix operations as part of a knowledge operation, i.e. knowledge extraction, reasoning, analysis, or the like (step 570). The results of this knowledge operation may then be output (step 580). Thus, the mechanisms of the illustrative embodiments specifically configured the computing devices upon which they are implemented for specifically performing this type of clustering-based matrix ordering operation, which is not performed by generic computing devices, and which improves the operation and functionality of the computing devices. Moreover, the mechanisms of the illustrative embodiments modify the functionality and performance of the computing devices upon which they are implemented by increasing the cache efficiency of the computing device during matrix operations.

It should be appreciated that steps 510-560 may be implemented prior to use of the reordered matrix and lookup table during runtime matrix operations. That is, these steps 510-560 may be used in a pre-processing of the matrix with the resulting reordered matrix and lookup table being output to the runtime system components for use in performing their runtime operations. In this way, the matrix need not be reordered each time a matrix operation is to be performed during runtime, which is represented as steps 570-580.

In some illustrative embodiments, partial reordering of a previously reordered matrix may be performed if updates to the matrix are identified to have been made. For example, in the social networking environment, if new users are added or users are removed from the matrix, then a partial reordering may be performed to adjust the reordered matrix and lookup table to accommodate the changes to the input matrix without having to perform the complete reordering process again each time a change occurs. For example, the steps 510-560 may be repeated, but only for the clusters affected by the change to the input matrix rather than performing these steps for all of the clusters or all of the elements of all of the clusters. In this way, incremental changes to the input matrix may be accommodated with incremental updates to the reordered matrix and lookup table.

Thus, the mechanisms of the illustrative embodiments generate a reordered matrix that concentrates non-zero elements along a diagonal of the matrix by clustering nodes of the input matrix into clusters so as to minimize cross-cluster connection lengths. Since these lengths are minimized, and non-zero elements are closely packed together, cache misses are reduced significantly with a corresponding increase in cache efficiency and runtime performance.

It should be noted that the above illustrative embodiments assume that the reordering is done symmetrically such that the clusters are concentrated along a diagonal of the matrix M. However, the mechanisms of the illustrative embodiments are not limited to symmetric reordering and instead the mechanisms of the illustrative embodiments may also be used to implement an asymmetric reordering operation. In an asymmetric reordering implementation, the row nodes or indices may be permuted different from the column indices so as to achieve an asymmetric reordering. While this may be accomplished in some illustrative embodiments, the down side of the asymmetric reordering implementation is that if another matrix multiplication is to be performed on the output vector O (which happens often in matrix operations), the output vector O needs to be permuted as well. This causes an additional processing cost to be incurred due to the need to perform multiple permutations. Symmetric reordering does not involve this extra processing cost. Because of this, it is envisioned that most actual implementations will involve symmetric reordering. However, it should be appreciated that the spirit and scope of the present invention encompasses the implementation of the mechanisms of the illustrative embodiments with asymmetric reordering.

It should be appreciated that the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
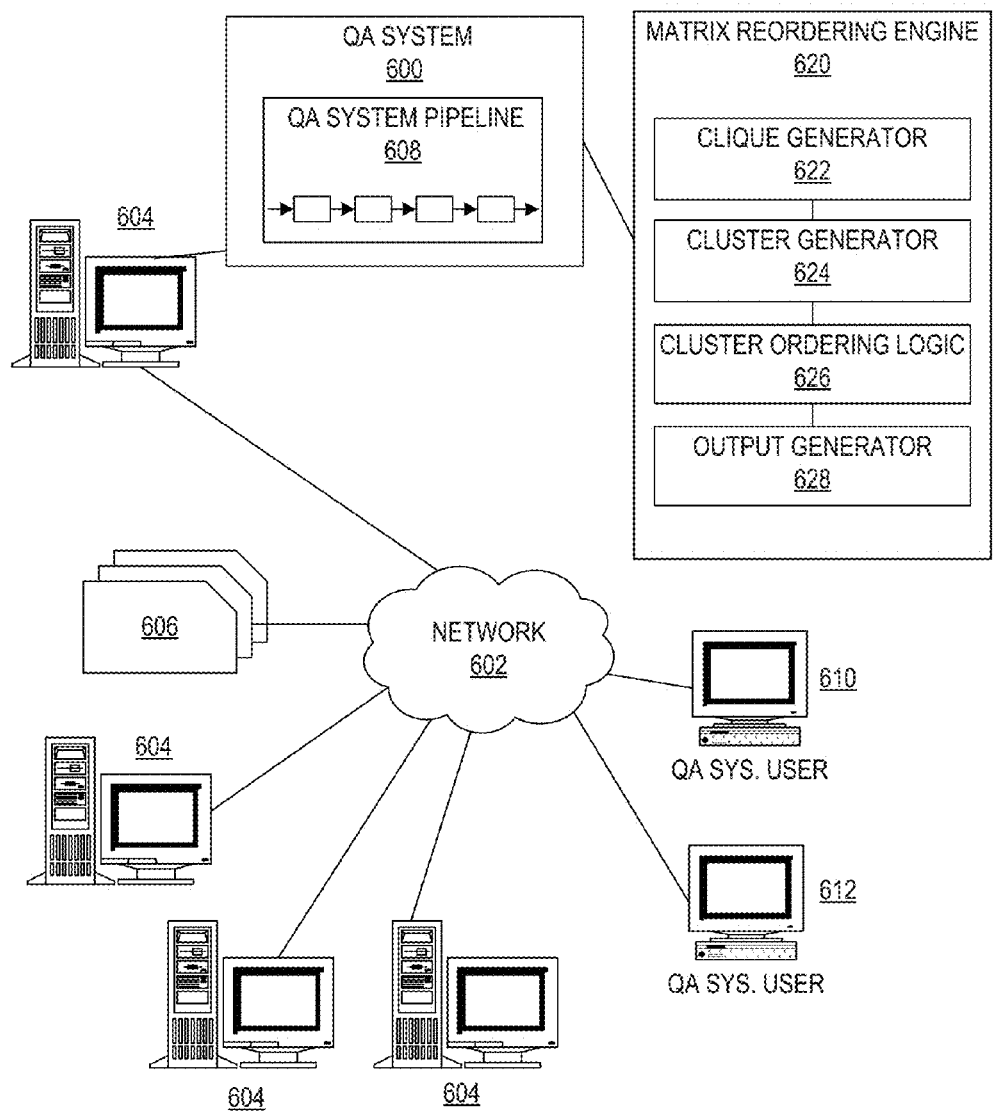
FIG. 6 depicts a schematic diagram of one illustrative embodiment of a question/answer creation (QA) system in a computer network.
Figure 7:
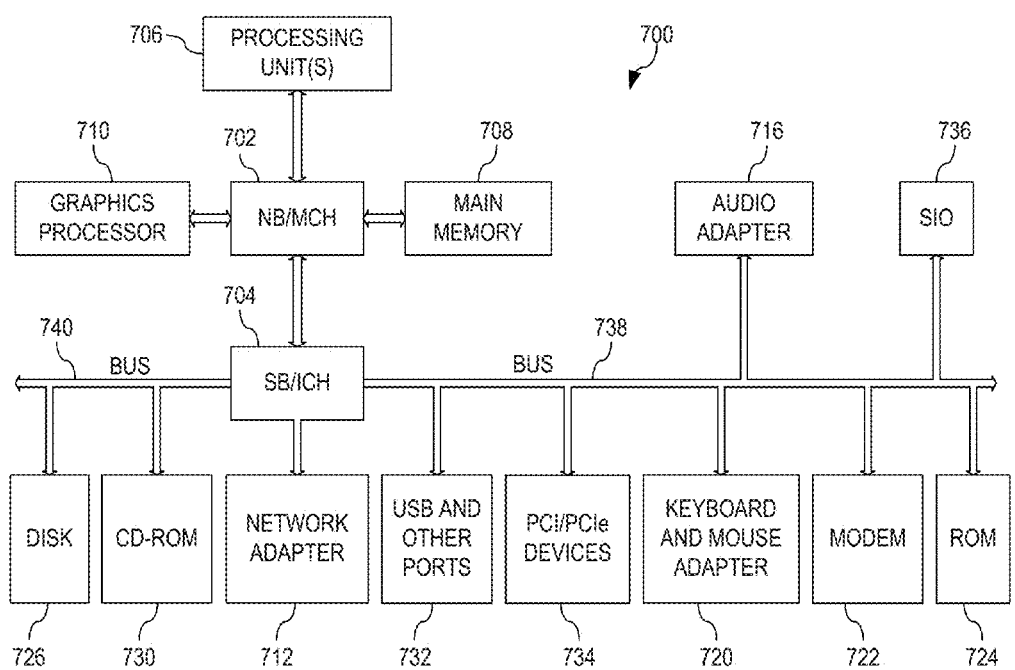
FIG. 7 is a block diagram of an example data processing system in which aspects of the illustrative embodiments are implemented.

As mentioned above, the mechanisms of the illustrative embodiments for performing cluster-based ordering of a matrix for improving cache efficiency during matrix operations may be implemented in many different types of systems and applications for performing a plethora of different types of operations, generally categorized into knowledge extraction, reasoning, and analytics. One such implementation of the mechanisms of the illustrative embodiments is in the use of matrix operations to assist in performing question answering in a Question and Answer (QA) system, such as the IBM Watson™ QA system. FIGS. 6-8 are provided hereafter to illustrate examples of an implementation of the mechanisms of the illustrative embodiments with a QA system. It should be appreciated that these figures are only illustrative and are not intended to limit the implementation of the present invention to only QA systems. Any type of system that performs matrix operations may implement the mechanisms of the illustrative embodiments without departing from the spirit and scope of the present invention. Moreover, many modifications to the depicted environments may be made without departing from the spirit and scope of the present invention.

FIGS. 6-8 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to reordering matrices used during the performance of matrix operations as part of the QA system's functions, e.g., corpus ingestion, evidence identification and scoring, and/or the like.

Since the QA system is used as one example of the implementation environment for the mechanisms of the illustrative embodiments, it is important to first have an understanding of how question and answer creation in a QA system is implemented before describing how the mechanisms of the illustrative embodiments are integrated in and augment such QA systems. It should be appreciated that the QA QA mechanisms described in FIGS. 6-8 are only examples and are not intended to state or imply any limitation with regard to the type of QA mechanisms with which the illustrative embodiments are implemented. Many modifications to the example QA system shown in FIGS. 6-8 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of reasoning algorithms (see, for example, McCord et al., "Deep Parsing in Watson," IBM J. Res. & Dev., vol. 56, no. 3/4, May/July 2012 for more information on deep analysis in IBM Watson™). There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 6 depicts a schematic diagram of one illustrative embodiment of a question/answer creation (QA) system 600 in a computer network 602. One example of a question/answer generation which may be used in conjunction with the principles described herein is described in U.S. Patent Application Publication No. 2011/0125734, which is herein incorporated by reference in its entirety. The QA system 600 is implemented on one or more computing devices 604 (comprising one or more processors and one or more memories, and potentially any other computing device elements generally known in the art including buses, storage devices, communication interfaces, and the like) connected to the computer network 602. The network 602 includes multiple computing devices 604 in communication with each other and with other devices or components via one or more wired and/or wireless data communication links, where each communication link comprises one or more of wires, routers, switches, transmitters, receivers, or the like. The QA system 600 and network 602 enables question/answer (QA) generation functionality for one or more QA system users via their respective computing devices 610-612. Other embodiments of the QA system 600 may be used with components, systems, sub-systems, and/or devices other than those that are depicted herein.

The QA system 600 is configured to implement a QA system pipeline 608 that receive inputs from various sources. For example, the QA system 600 receives input from the network 602, a corpus of electronic documents 606, QA system users, and/or other data and other possible sources of input. In one embodiment, some or all all of the inputs to the QA system 600 are routed through the network 602. The various computing devices 604 on the network 602 include access points for content creators and QA system users. Some of the computing devices 604 include devices for a database storing the corpus of data 606 (which is shown as a separate entity in FIG. 6 for illustrative purposes only). Portions of the corpus of data 606 may also be provided on one or more other network attached storage devices, in one or more databases, or other computing devices not explicitly shown in FIG. 6. The network 602 includes local network connections and remote connections in various embodiments, such that the QA system 600 may operate in environments of any size, including local and global, e.g., the Internet.

In one embodiment, the content creator creates content in a document of the corpus of data 606 for use as part of a corpus of data with the QA system 600. The document includes any file, text, article, or source of data for use in the QA system 600. QA system users access the QA system 600 via a network connection or an Internet connection to the network 602, and input questions to the QA system 600 that are answered by the content in the corpus of data 606. In one embodiment, the questions are formed using natural language. The QA system 600 parses and interprets the question, and provides a response to the QA system user, e.g., QA system user 610, containing one or more answers to the question. In some embodiments, the QA system 600 provides a response to users in a ranked list of candidate answers while in other illustrative embodiments, the QA system 600 provides a single final answer or a combination of a final answer and ranked listing of other candidate answers.

The QA system 600 implements a QA system pipeline 608 which comprises a plurality of stages for processing an input question and the corpus of data 606. The QA system pipeline 608 generates answers for the input question based on the processing of the input question and the corpus of data 606. The QA system pipeline 608 will be described in greater detail hereafter with regard to FIG. 3.

In some illustrative embodiments, the QA system 600 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user user that submitted the input question, or from which a final answer is selected and presented to the user. More information about the IBM Watson™ QA system may be be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 6, in accordance with the mechanisms of the illustrative embodiments, a matrix reordering engine 620 is provided in association with the QA system 600. While shown as a separate element in FIG. 6, in some illustrative embodiments, the matrix reordering engine 620 may be integrated into the QA system 600 and/or the QA system pipeline 608. The matrix reordering engine 620 comprises a clique generator 622, a cluster generator 624, a cluster ordering logic 626, and an output generator 628, each of which may be implemented in specialized hardware, software executed on hardware, or any combination of specialized hardware and software executed on hardware of one or more computing devices. The operation of the matrix reordering engine 620 may be performed as a pre-processor for a matrix utilized by the QA system pipeline 608, for example, such as during ingestion of a corpus. Alternatively, the operation of the matrix reordering engine 620 may be invoked during runtime operation of the QA system pipeline 608, such as part of identification of evidence in the corpus and scoring of the evidence to generate confidence scores for candidate answers, for example. In short, the operation of the matrix reordering engine 620 may be invoked at any time that a matrix operation is to be performed as part of the operation of the QA system 600.

The clique generator 622 of the matrix reordering engine 620 comprises logic that operates to identify cliques of matrix nodes in an input matrix. In generating these cliques, the relationships between nodes (as specified by non-zero elements of the matrix) as well as minimum size requirements may be processed to generate a set of cliques from which clustering of the nodes and their corresponding non-zero elements of the matrix may be performed. This corresponds to step 510 in FIG. 5 as described above.

The cluster generator 624 comprises logic that operates to grow clusters of matrix nodes from the initial set of cliques and refine these clusters so as to minimize cross-cluster connections. As discussed above, the clustering may comprise assigning each node of the matrix not already in a clique to a cluster based on the numbers of connections that the node has to each of the clusters. Moreover, the refinement of the clusters may comprise moving nodes from one cluster to another so as to minimize cross-cluster connections while complying with cluster maximum size limitations and ensuring that the total number of cross-cluster connections (or edges) is reduced. The process of the cluster generator 624 may be repeated iteratively until no further appreciable improvement is achievable, e.g., the number of cross-cluster connections can no longer be reduced. These operations correspond to steps 520-530 in FIG. 5, for example.

The cluster ordering logic 626 comprises logic that operates to order the refined clusters so as to minimize total length of cross-cluster connections and concentrate cross-cluster connections in terms of their two endpoint node distribution. In addition, the cluster ordering logic 626 may optionally reorder the elements within each cluster so as to move non-zero elements closer to the diagonal of the cluster. This corresponds to steps 540-550 in FIG. 5, for example.

The output generator 628 is responsible for tracking the changes to the matrix made by the reordering operations of the other elements 622-626 in lookup table vectors as well as maintaining a vector of the original location of the nodes in the matrix. This lookup table and the reordered matrix may be output by the output generator 628 in a format usable by the QA system 600 in performing a matrix operation, e.g., matrix to vector multiplication operation, on the input matrix.

FIG. 7 is a block diagram of an example data processing system in which aspects of the illustrative embodiments are implemented. Data processing system 700 is an example of a computer, such as server 604 or client 610 in FIG. 6, in which computer usable code or instructions implementing the processes for illustrative embodiments of the present invention are located. In one illustrative embodiment, FIG. 7 represents a server computing device, such as a server 604, which, which implements a QA system 600 and QA system pipeline 608 augmented to include the additional mechanisms of the illustrative embodiments described hereafter.

In the depicted example, data processing system 700 employs a hub architecture including north bridge and memory controller hub (NB/MCH) 702 and south bridge and input/output (I/O) controller hub (SB/ICH) 704. Processing unit 706, main memory 708, and graphics processor 710 are connected to NB/MCH 702. Graphics processor 710 is connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 is connected to SB/ICH 704.

An operating system runs on processing unit 706. The operating system coordinates and provides control of various components within the data processing system 700 in FIG. 7. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 700.

As a server, data processing system 700 may be, for example, an IBM® eServer™ System p® computer system, running the Advanced Interactive Executive (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and are loaded into main memory 708 for execution by processing unit 706. The processes for illustrative embodiments of the present invention are performed by processing unit 706 using computer usable program code, which is located in a memory such as, for example, main memory 708, ROM 724, or in one or more peripheral devices 726 and 730, for example.

A bus system, such as bus 738 or bus 740 as shown in FIG. 7, is comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, includes one or more devices used to transmit and receive data. A memory may be, for example, main memory 708, ROM 724, or a cache such as found in NB/MCH 702 in FIG. 7.

Those of ordinary skill in the art will appreciate that the hardware depicted in FIGS. 1 and 7 may vary depending on the implementation. Other internal hardware or peripheral devices, such as flash memory, equivalent non-volatile memory, or optical disk drives and the like, may be used in addition to or in place of the hardware depicted in FIGS. 1 and 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

FIG. 8 illustrates a QA system pipeline for processing an input question in accordance with one illustrative embodiment. The QA system pipeline of FIG. 8 may be implemented, for example, as QA system pipeline 608 of QA system 600 in FIG. 6. It should be appreciated that the stages of the QA system pipeline shown in in FIG. 8 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems.

Moreover, although not explicitly shown as separate blocks in FIG. 8, the QA system pipeline 800 utilizes interfaces, denoted by arrows in the figure, to access the corpus 847 or corpora 845 of information stored in one or more storage devices.

The QA system pipeline of FIG. 8 is augmented, for example, in one or more of the stages to implement the improved mechanism of the illustrative embodiments described herein. Moreover, additional stages may be provided to implement the improved mechanism, or separate logic from the pipeline 800 may be provided for interfacing with the pipeline 800 and implementing the improved functionality and operations of the illustrative embodiments.

As shown in FIG. 8, the QA system pipeline 800 comprises a plurality of stages 810-880 through which the QA system operates to analyze an input question and generate a final response. In an initial question input stage 810, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 800, i.e. the question and topic analysis stage 820, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 8, the identified major features are then used during the question decomposition stage 830 to decompose the question into one or more queries that are applied to the corpora of data/information 845 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 845. That is, these various sources themselves, different collections of sources, and the like, represent a different corpus 847 within the corpora 845. There may be different corpora 847 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 847 within the corpora 845.

The queries are applied to one or more databases storing information about the electronic texts, documents, articles, websites, and the like, that make up the corpus of data/information, e.g., the corpus of data 606 in FIG. 6. The queries are applied to the corpus of data/information at the hypothesis generation stage 840 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 840, to generate hypotheses for answering the input question. These hypotheses are also referred to herein as "candidate answers" for the input question. For any input question, at this stage 840, there may be hundreds of hypotheses or candidate answers generated that may need to be evaluated.

The QA system pipeline 800, in stage 850, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used used to generate scores for candidate answers and evidence without departing from the spirit and scope of the present invention.

In the synthesis stage 860, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 870 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 880, a final answer and confidence score, or final set of candidate answers and confidence scores, are generated and output to the submitter of the original input question via a graphical user interface or other mechanism for outputting information.

As shown in FIG. 8, the QA system pipeline 800 further operates in association with one or more matrix reordering engines 892 and 896 that operate on an input matrix in the manner previously described above to generate a reordered matrix 894, 898 and its corresponding lookup table (not shown). The matrix ordering engine 892, 896 may be a single engine or multiple engines as shown. Multiple matrix ordering engines 892, 896 are shown in FIG. 8 only to illustrate different stages of the pipeline 800 where such matrix ordering may be utilized. In actuality, the matrix ordering engine 892 may be utilized in a single location of the pipeline 800 and even other stages than those shows as being associated with the matrix ordering engines in FIG. 8.

As shown in FIG. 8, in one illustrative embodiment, the matrix ordering engine 892 may operate as part of a corpus ingestion engine 890 and may operate on a matrix of information representing documents in the corpus 847 or corpora 845. Thus, in this sense, the matrix ordering engine 892 operates as a pre-processor of the corpus 847 or corpora 845 and generates a reordered matrix 894 and lookup table that may be utilized by the hypothesis generation stage 840 to generate candidate answers to an input question. For example, the matrix that is operated on may comprise nodes indicative of concepts within documents of the corpus and may be used to identify which documents have related concepts (as indicated by non-zero elements at the intersections of these concept nodes). This information may be used along with the extracted features of the input question 810 and the queries generated by the question decomposition 830 to identify documents in the corpora 845 or corpus 847 that potentially provide the candidate answer to the input question 810.

In another illustrative embodiment, the matrix ordering engine 896 may be integrated into the QA system pipeline 800 and may operate at runtime to assist in evaluating evidence for scoring the various hypotheses (candidate answers). The reordered matrix 898 may be used to represent evidential content of the documents and correlate this evidence to the candidate answers to determine how much support there is for each candidate answer and thus, a confidence measure in the candidate answer. Matrix operations may be performed to generate such confidence measures and may utilize the reordered matrix 898 to perform such matrix operations. Other implementations of the QA system may utilize the matrix ordering engines and reordered matrix in other stages or other operations that implement matrix operations, such as a matrix to vector multiplication operation.

Thus, the illustrative embodiments provide mechanisms for improving the execution of matrix operations in a computing device by providing cluster-based reordering of matrices. The cluster-based reordering provides compact ordering of non-zero elements of a matrix, even in the case of large scale matrices that have a near-scale-free graph topology. The compact ordering of the non-zero elements increases cache efficiency during matrix operations and results in improvement of the performance of matrix operations.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for performing a matrix operation, the method comprising:
   configuring the processor of the data processing system to perform cluster-based matrix reordering of an input matrix;
   receiving, by the processor, the input matrix, wherein the input matrix comprises nodes associated with elements of the matrix;
   clustering, by the processor, the nodes into clusters based on numbers of connections with other nodes within and between the clusters;
   ordering, by the processor, the clusters by minimizing a total length of cross cluster connections between nodes of the clusters, to thereby generate a reordered matrix;
   generating, by the processor, a lookup table identifying new locations of nodes of the input matrix, in the reordered matrix;
   storing, in a memory of the data processing system, data corresponding to the nodes in accordance with the new locations of nodes in the reordered matrix; and
   performing, by the processor, a matrix operation based on the reordered matrix and the lookup table at least by loading data corresponding to nodes in the reordered matrix into a cache memory of the data processing system, wherein the storage of the data corresponding to the nodes in accordance with the new locations of nodes in the reordered matrix minimizes cache misses in the cache memory when performing the matrix operation.

2. The method of claim 1, wherein the nodes of the input matrix represent at least one of information, concepts, or entities, and wherein the elements of the matrix represent connections or relationships between the nodes where a non-zero element indicates a connection between the nodes associated with the element.

3. The method of claim 1, wherein clustering nodes into clusters further comprises:
identifying one or more cliques of nodes in the input matrix, wherein a clique of nodes comprises only nodes that have connections to one another and vice versa; and
growing at least one clique of nodes in the one or more cliques of nodes into a cluster of nodes by assigning other nodes of the input matrix, not already in a clique of nodes, to the at least one clique based on connections of the other nodes to nodes already in the at least one clique.

4. The method of claim 3, wherein clustering nodes into clusters further comprises:
comparing a size of each clique of nodes in the one or more cliques of nodes to a minimum clique size, wherein the minimum clique size specifies a minimum number of nodes required to be in a clique for growing a cluster based on the clique; and
performing the growing of the at least one clique of nodes only on cliques of nodes in the one or more cliques of nodes that have a size that meets or exceeds the minimum clique size.

5. The method of claim 3, wherein assigning other nodes of the input matrix to the at least one clique comprises assigning each of the other nodes to a respective clique, in the at least one clique, to which the other node has a greatest number of connections.

6. The method of claim 3, wherein growing the at least one clique of nodes comprises assigning other nodes of the input matrix to the at least one clique until a maximum cluster size is reached.

7. The method of claim 6, wherein the maximum cluster size is a proportion of a cache memory size of a cache memory associated with the processor.

8. The method of claim 3, wherein clustering the nodes further comprises, for each cluster, and for each node of each cluster:
refining the cluster by evaluating the node of the cluster to determine if the node has more connections to nodes of another cluster than to nodes within the cluster; and
migrating the node to the other cluster if the node has more connections to nodes of the other cluster than to nodes within the cluster and migrating the node does not violate a maximum cluster size limitation of the other cluster.

9. The method of claim 1, wherein ordering the clusters by minimizing a total length of cross cluster connections between nodes of the clusters, to thereby generate a reordered matrix further comprises performing localized ordering of nodes within each of the clusters, wherein the localized ordering of nodes within each of the clusters comprises moving non-zero elements of the cluster closer to a diagonal of a sub-matrix of the cluster and moving nodes having connections to nodes in adjacent clusters closer to a border of the sub-matrix of the cluster.

10. The method of claim 1, wherein the matrix operation is a multiplication of the matrix by a vector to generate an output vector, and wherein the method further comprises:
performing an analysis operation, based on the matrix operation, to extract information from the input matrix based on the reordered matrix and the lookup table; and
outputting results of the analysis operation.

11. A computer program product comprising a computer readable storage medium having a computer readable program stored therein, wherein the computer readable program, when executed on a computing device, causes the computing device to:
configure the computing device to perform cluster-based matrix reordering of an input matrix;
receive the input matrix, wherein the input matrix comprises nodes associated with elements of the matrix;
cluster the nodes into clusters based on numbers of connections with other nodes within and between the clusters;
order the clusters by minimizing a total length of cross cluster connections between nodes of the clusters, to thereby generate a reordered matrix;
generate a lookup table identifying new locations of nodes of the input matrix, in the reordered matrix;
store, in a memory of the computing device, data corresponding to the nodes in accordance with the new locations of nodes in the reordered matrix; and
perform a matrix operation based on the reordered matrix and the lookup table at least by loading data corresponding to nodes in the reordered matrix into a cache memory of the computing device, wherein the storage of the data corresponding to the nodes in accordance with the new locations of nodes in the reordered matrix minimizes cache misses in the cache memory when performing the matrix operation.

12. The computer program product of claim 11, wherein the nodes of the input matrix represent at least one of information, concepts, or entities, and wherein the elements of the matrix represent connections or relationships between the nodes where a non-zero element indicates a connection between the nodes associated with the element.

13. The computer program product of claim 11, wherein the computer readable program causes the computing device to cluster nodes into clusters at least by:
identifying one or more cliques of nodes in the input matrix, wherein a clique of nodes comprises only nodes that have connections to one another and vice versa; and
growing at least one clique of nodes in the one or more cliques of nodes into a cluster of nodes by assigning other nodes of the input matrix, not already in a clique of nodes, to the at least one clique based on connections of the other nodes to nodes already in the at least one clique.

14. The computer program product of claim 13, wherein the computer readable program causes the computing device to cluster nodes into clusters at least by:
comparing a size of each clique of nodes in the one or more cliques of nodes to a minimum clique size, wherein the minimum clique size specifies a minimum number of nodes required to be in a clique for growing a cluster based on the clique; and
performing the growing of the at least one clique of nodes only on cliques of nodes in the one or more cliques of nodes that have a size that meets or exceeds the minimum clique size.

15. The computer program product of claim 13, wherein assigning other nodes of the input matrix to the at least one clique comprises assigning each of the other nodes to a respective clique, in the at least one clique, to which the other node has a greatest number of connections.

16. The computer program product of claim 13, wherein growing the at least one clique of nodes comprises assigning other nodes of the input matrix to the at least one clique until a maximum cluster size is reached.

17. The computer program product of claim 16, wherein the maximum cluster size is a proportion of a cache memory size of a cache memory associated with the processor.

18. The computer program product of claim 13, wherein the computer readable program causes the computing device to cluster the nodes at least by, for each cluster, and for each node of each cluster:

refining the cluster by evaluating the node of the cluster to determine if the node has more connections to nodes of another cluster than to nodes within the cluster; and migrating the node to the other cluster if the node has more connections to nodes of the other cluster than to nodes within the cluster and migrating the node does not violate a maximum cluster size limitation of the other cluster.

19. The computer program product of claim 11, wherein the computer readable program causes the computing device to order the clusters by minimizing a total length of cross cluster connections between nodes of the clusters, to thereby generate a reordered matrix at least by performing localized ordering of nodes within each of the clusters, wherein the localized ordering of nodes within each of the clusters comprises moving non-zero elements of the cluster closer to a diagonal of a sub-matrix of the cluster and moving nodes having connections to nodes in adjacent clusters closer to a border of the sub-matrix of the cluster.

20. An apparatus comprising:
a processor;
a cache coupled to the processor; and
a memory coupled to the processor, wherein the memory comprises instructions which, when executed by the processor, configure the processor to perform cluster-based matrix reordering of an input matrix and to:
receive the input matrix, wherein the input matrix comprises nodes associated with elements of the matrix;
cluster the nodes into clusters based on numbers of connections with other nodes within and between the clusters;
order the clusters by minimizing a total length of cross cluster connections between nodes of the clusters, to thereby generate a reordered matrix;
generate a lookup table identifying new locations of nodes of the input matrix, in the reordered matrix;
store, in the memory, data corresponding to the nodes in accordance with the new locations of nodes in the reordered matrix; and
perform, by the processor, a matrix operation based on the reordered matrix and the lookup table at least by loading data corresponding to nodes in the reordered matrix into the cache, wherein the storage of the data corresponding to the nodes in accordance with the new locations of nodes in the reordered matrix minimizes cache misses in the cache when performing the matrix operation.

21. A Question and Answer (QA) system, comprising:
at least one processor; and
an interface for accessing one or more storage devices that store a corpus of natural language content that is processed by the QA system to generate answers to received questions, wherein the at least one processor is configured to implement:
a QA system pipeline that receives an input question and generates one or more answers to the input question at least by processing the corpus of natural language content;
a matrix ordering engine coupled to the QA system pipeline, wherein the matrix reordering engine is configured to:
receive an input matrix, wherein the input matrix comprises nodes associated with elements of the matrix, and wherein the nodes represent concepts found in the natural language content and the elements of the matrix represent connections between the concepts found in the natural language content;
cluster the nodes into clusters based on numbers of connections with other nodes within and between the clusters;
order the clusters by minimizing a total length of cross cluster connections between nodes of the clusters, to thereby generate a reordered matrix;
generate a lookup table identifying new locations of nodes of the input matrix, in the reordered matrix;
store, in the memory, data corresponding to the nodes in accordance with the new locations of nodes in the reordered matrix; and
perform, by the processor, a matrix operation based on the reordered matrix and the lookup table at least by loading data corresponding to nodes in the reordered matrix into the cache, wherein the storage of the data corresponding to the nodes in accordance with the new locations of nodes in the reordered matrix minimizes cache misses in the cache when performing the matrix operation.

* * * * *